United States Patent
Koike et al.

(10) Patent No.: US 8,583,376 B2
(45) Date of Patent: Nov. 12, 2013

(54) RESONANCE CALCULATION PROGRAM AND ANALYZING APPARATUS

(75) Inventors: Hiroki Koike, Tokyo (JP); Hideki Matsumoto, Tokyo (JP); Kazuya Yamaji, Tokyo (JP); Daisuke Sato, Tokyo (JP); Shinobu Tsubota, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 485 days.

(21) Appl. No.: 13/195,355

(22) Filed: Aug. 1, 2011

(65) Prior Publication Data
US 2012/0215444 A1    Aug. 23, 2012

(30) Foreign Application Priority Data
Feb. 18, 2011 (JP) .................................. 2011-033411

(51) Int. Cl.
*G06F 19/00* (2011.01)
(52) U.S. Cl.
USPC ............................................................. 702/1
(58) Field of Classification Search
USPC ............................................................. 702/1
See application file for complete search history.

(56) References Cited

U.S. PATENT DOCUMENTS

2013/0173233 A1 *   7/2013   Cheatham et al. ................. 703/2

FOREIGN PATENT DOCUMENTS

JP    2005-106540 A    4/2005
JP    2005-227174 A    8/2005

OTHER PUBLICATIONS

H. Koike et al., Fall Meeting of the Atomic Energy Society of Japan, 2010, p. 985.

* cited by examiner

*Primary Examiner* — Aditya Bhat
(74) *Attorney, Agent, or Firm* — Westerman, Hattori, Daniels & Adrian, LLP

(57) ABSTRACT

[Problem to be Solved] To provide a resonance calculation program capable of evaluating a physical quantity such as an effective cross section in a radial direction of a circular region of a fuel rod by making a resonance calculation based on the equivalence principle.
[Solution] A resonance calculation program for calculating an effective cross section by performing a resonance calculation based on an equivalence principle includes a radial-distribution calculation step S8 of calculating a distribution of the effective cross section in a radial direction of a circular region by calculating the effective cross section defined by a predetermined calculation expression including a geographical coefficient for each of a plurality of annular regions while a neutron escape probability in a resonance region is expressed by a polynomial rational expression including the geographical coefficient serving as a factor representing geographical shapes of a plurality of annular regions that are circumferentially annular and that are obtained by radially dividing the circular region that is an axial cross section of a fuel rod at predetermined intervals.

4 Claims, 6 Drawing Sheets

RESONANCE CALCULATION PROGRAM AND ANALYZING APPARATUS

TECHNICAL FIELD

The present invention relates to a resonance calculation program and an analyzing apparatus for calculating an effective cross section that is an input value for neutron transport calculation at a time of calculating a neutron flux of a fuel assembly by the neutron transport calculation.

BACKGROUND ART

There is conventionally known, as a resonance calculation program, a cross section calculation program including a step of calculating a background cross section, and a step of acquiring a resonance integral from a resonance integral table with the background cross section used as an argument and calculating an effective cross section (effective group constants) based on the acquired resonance integral (see, for example, Patent Literature 1).

CITATION LIST

Patent Literature

[PTL 1] JP 2005-227174A

SUMMARY OF INVENTION

Technical Problem

The conventional cross-section calculation program is a calculation method of calculating an effective cross section with a background cross section set as an argument based on an equivalence principle. According to the calculation method using the equivalence principle, a circular region on an axial cross section of a fuel rod is usually dealt with as a single fuel bulk, that is, a single region. Due to this, it is difficult for the conventional cross-section calculation program to evaluate an effective cross-section distribution in a radial direction of the circular region of the fuel rod, and to precisely evaluate distribution of a physical quantity such as a neutron flux obtained from the effective cross section or a reaction rate obtained from the effective cross section.

Therefore, an object of the present invention is to provide a resonance calculation program and an analyzing apparatus capable of precisely evaluating an effective cross section obtained by a resonance calculation based on the equivalence principle and a physical quantity obtained from the effective cross section in a radial direction of a circular region of a fuel rod.

Solution to Problem

According to an aspect of the present invention, a non-transitory computer readable media includes a resonance calculation program executable on hardware for performing a resonance calculation based on equivalence principle of calculating an effective cross section serving as an input value for neutron transport calculation at a time of calculating a neutron flux in a fuel assembly storing a cylindrical fuel rod by the neutron transport calculation. A cross section of the fuel assembly taken along an orthogonal plane orthogonal to an axial direction of the fuel rod is defined as an analysis target region for the resonance calculation, the analysis target region is divided into a plurality of detailed regions, a part of the detailed regions serving as a resonance region where a resonance phenomenon occurs, a neutron escape probability in the resonance region is obtained by a polynomial rational expression including a first rational coefficient, a second rational coefficient, and a geographical coefficient, the first and second rational coefficients serving as factors representing a gray range from a black body the resonance region of which absorbs all neutrons to a white body the resonance region of which absorbs no neutrons, the geographical coefficient serving as a factor representing geographical shapes of a plurality of annular regions that are circumferentially annular and that are obtained by radially dividing a circular region that is an axial cross section of the fuel rod at predetermined intervals. The resonance calculation program includes: a coefficient calculation step of calculating the first rational coefficient and the second rational coefficient to satisfy a physical quantity calculated over the gray range by a method of characteristics; a background cross-section calculation step of calculating a background cross section based on the calculated first rational coefficient and an average chord length corresponding to four regions expressing the annular regions; an effective cross-section interpolation step of interpolating the effective cross section from the background cross section; an effective cross-section calculation step of calculating the effective cross section depending on the annular regions by synthesizing the interpolated effective cross section based on the second rational coefficient and the geographical coefficient; and a radial-distribution calculation step of calculating distribution of the physical quantity in a radial direction of the circular region using the effective cross section dependent on the annular regions.

With this configuration, the polynomial rational expression representing the neutron escape probability includes, as a factor, the geographical coefficient representing geographical shapes of a plurality of annular regions obtained by dividing the circular region of the fuel rod. Due to this, it is possible to precisely evaluate the distribution of the physical quantity including the effective cross section in the radial direction of the circular region of the fuel rod by calculating the physical quantity for each of the annular regions based on the geographical coefficient.

Advantageously, in the non-transitory computer readable media, the geographical coefficient is represented by four terms corresponding to the four regions expressing the predetermined annular regions, a first term of the geographical coefficient represents a first region where neutrons pass through an interior of a circular region constituted by an outer circumference of a predetermined annular region among those escaping from the outer circumference of the predetermined annular region to an outer circumference of the fuel rod, a second term of the geographical coefficient represents a second region where neutrons do not pass through the interior of the circular region constituted by the outer circumference of the predetermined annular region among those escaping from the outer circumference of the predetermined annular region to the outer circumference of the fuel rod, a third term of the geographical coefficient represents a third region where neutrons pass through an interior of a circular region located inside of the predetermined annular region among those escaping from the outer circumference of the circular region to the outer circumference of the fuel rod, a fourth term of the geographical coefficient represents a fourth region where neutrons do not pass through the interior of the circular region located inside of the predetermined annular region among those escaping from the outer circumference of the circular region to the outer circumference of the fuel rod, and at the radial-distribution calculation step, the effective cross section in the predetermined annular region or the physical quantity obtained from the effective cross section is calculated by subtracting a second circular region from a first circular region, the first circular region being inside of the outer circumference of the predetermined annular region and obtained by subtracting the second region from the first region, the second circular region being inside of an inner circumference of the predetermined annular region and obtained by subtracting the fourth region from the third region.

With this configuration, the effective cross section or physical quantity in the predetermined annular region can be easily calculated.

Advantageously, in the non-transitory computer readable media, the neutron escape probability in the resonance region is expressed by following calculation equation (1):

[Equation 1]

$$P_{e,i}^{lat}(E) = \sum_{m=1}^{4} \gamma_{i,m} \sum_{n=1}^{N} \beta_n \frac{\alpha_n}{\sum_{t} (E) l_{i,m} + \alpha_n} \quad (1)$$

E ... Neutron energy
$P_{e,i}^{lat}(E)$ ... Neutron escape probability in annular region i with respect to lattice system
$\alpha_n$ ... First rational coefficient
$\beta_n$ ... Second rational coefficient
$\Sigma_t^f$ ... Macroscopic total cross section in a resonance region f
$l_{i,m}$ ... Average chord length in the annular region i
$\gamma_{i,m}$ ... Geographical coefficient in annular region i.

With this configuration, the neutron escape probability can be appropriately defined by using the calculation equation (1), and the effective cross section in the resonance region can be calculated over the radial direction of the circular region of the fuel rod using this neutron escape probability.

According to another aspect of the present invention, an analyzing apparatus is configured to execute the resonance calculation program of any one of above.

With this configuration, the physical quantity including the effective cross section can be calculated over the radial direction of the circular region of the fuel rod by using the resonance calculation program.

Advantageous Effects of Invention

The resonance calculation program and the analyzing apparatus according to the present invention can evaluate the distribution of the physical quantity in the radial direction of the circular region of the fuel rod because of the capability to calculate the circular region of the fuel rod for each of a plurality of annular regions.

DESCRIPTION OF EMBODIMENTS

Exemplary embodiments of a resonance calculation program and an analyzing apparatus according to the present invention will be explained below in detail with reference to the accompanying drawings. The present invention is not limited to the embodiments. In addition, constituent elements in the following embodiments include those that can be replaced by persons skilled in the art or that are substantially equivalent.

EMBODIMENTS

A resonance calculation program according to an embodiment of the present invention is incorporated in a reactor core analysis program for evaluating fuel assemblies in a reactor core. The reactor core analysis program can be executed on hardware. By calculating a neutron flux in the reactor core, the reactor core analysis program predicts and evaluates a distribution and behaviors of neutrons acting as an intermediary of a nuclear reaction in the reactor core. Further, a reactor core is designed based on an analysis result obtained by this reactor core analysis program. The reactor core design is made to replace fuel loaded in the reactor core in light of safety, burn-up efficiency, fuel arrangement and the like.

Figure 1:
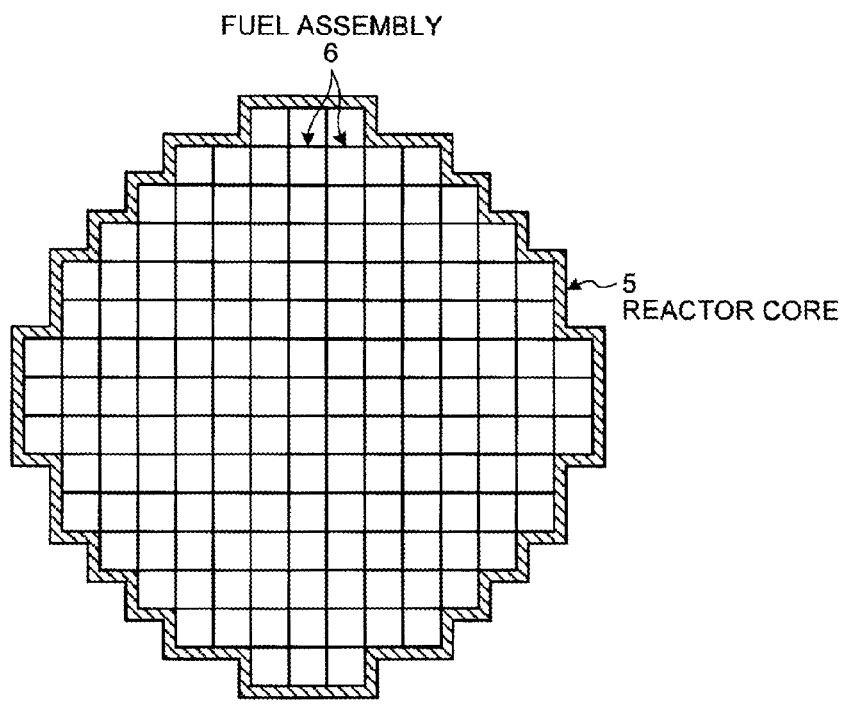
FIG. 1 is a structure diagram for schematically depicting a reactor core serving as an analysis target of an analyzing apparatus that can execute a resonance calculation program according to an embodiment of the present invention.
Figure 2:
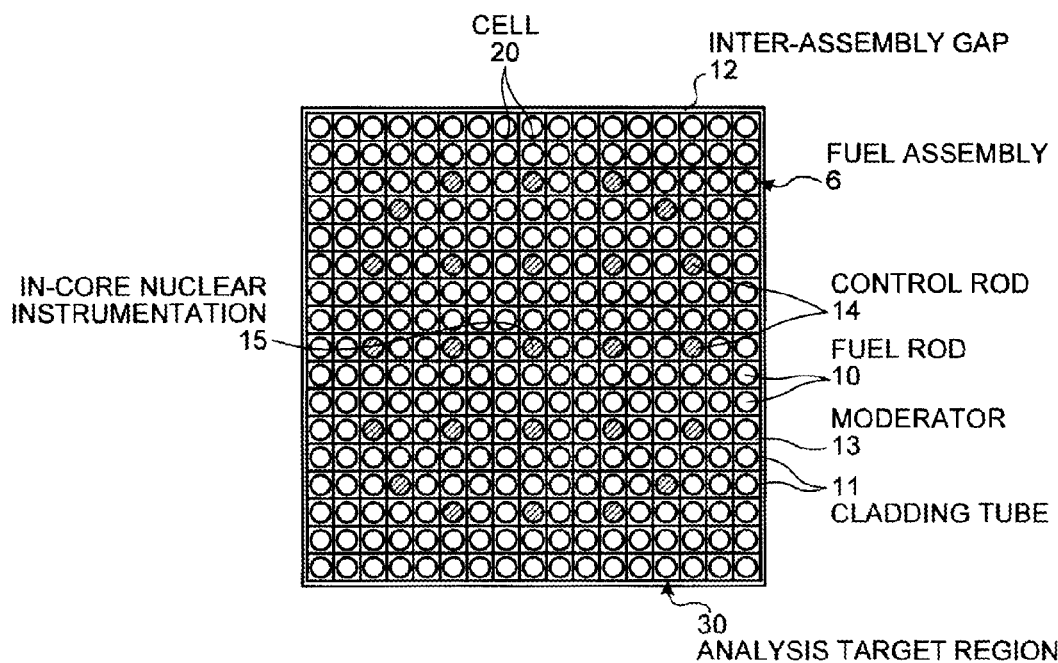
FIG. 2 is a cross-sectional view of a fuel assembly serving as an analysis target region, taken along a plane orthogonal to an axial direction of the fuel assembly.
Figure 3:
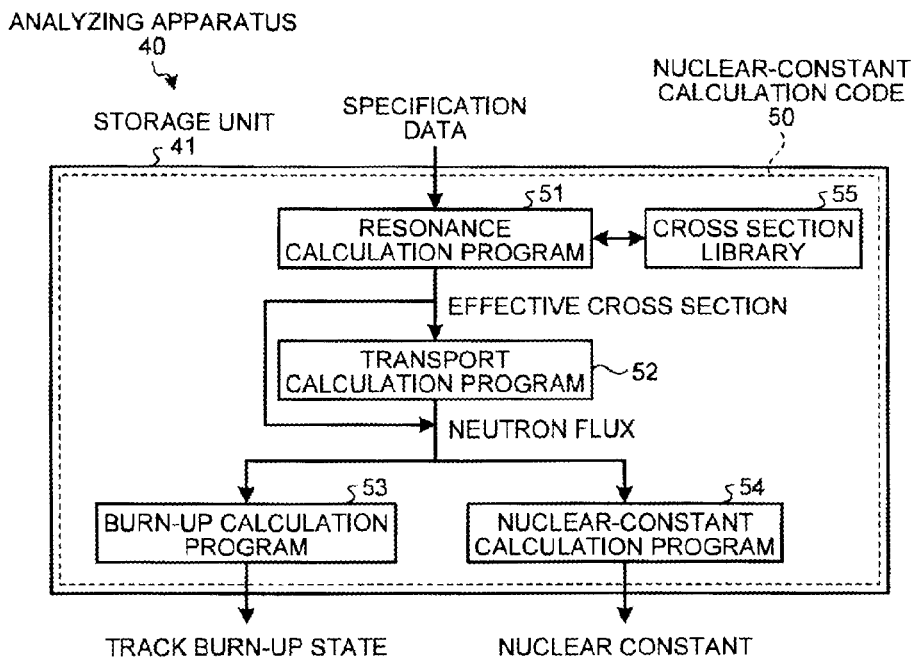
FIG. 3 is an explanatory diagram for schematically depicting the analyzing apparatus.
Figure 4:
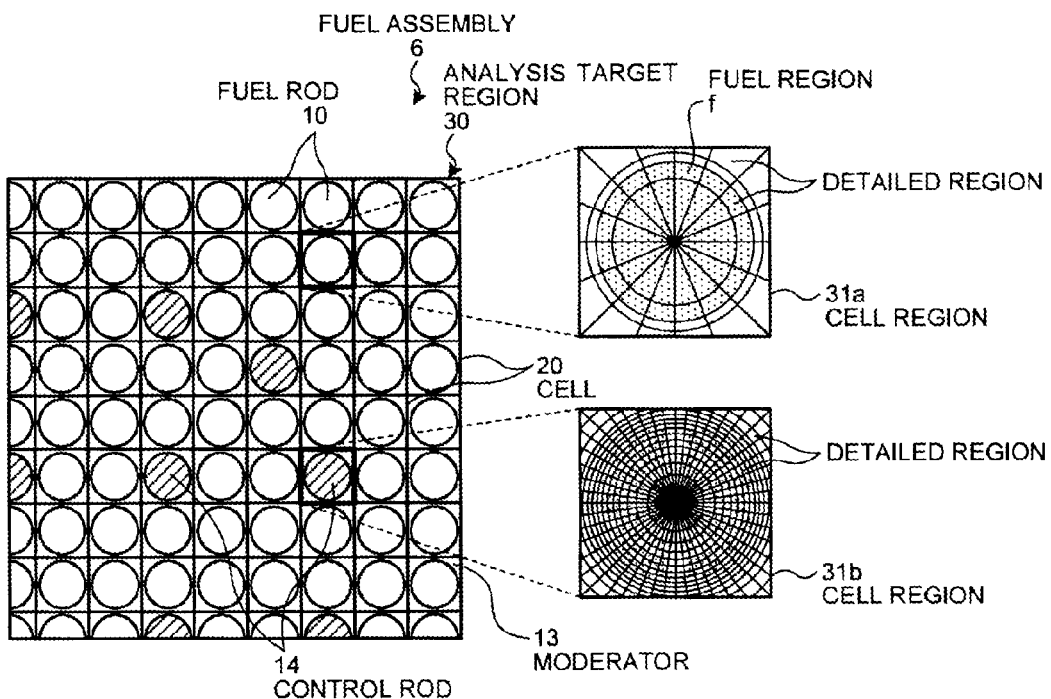
FIG. 4 is an explanatory diagram for depicting an analysis target region divided into a plurality of detailed regions.
Figure 5:
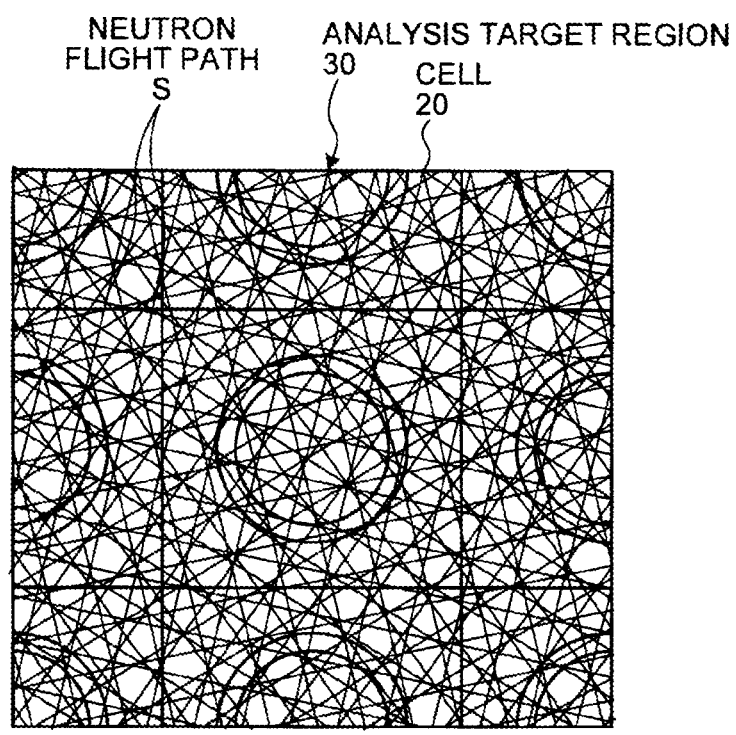
FIG. 5 is an explanatory diagram for depicting an analysis target region on which neutron flight paths are drawn.
Figure 6:
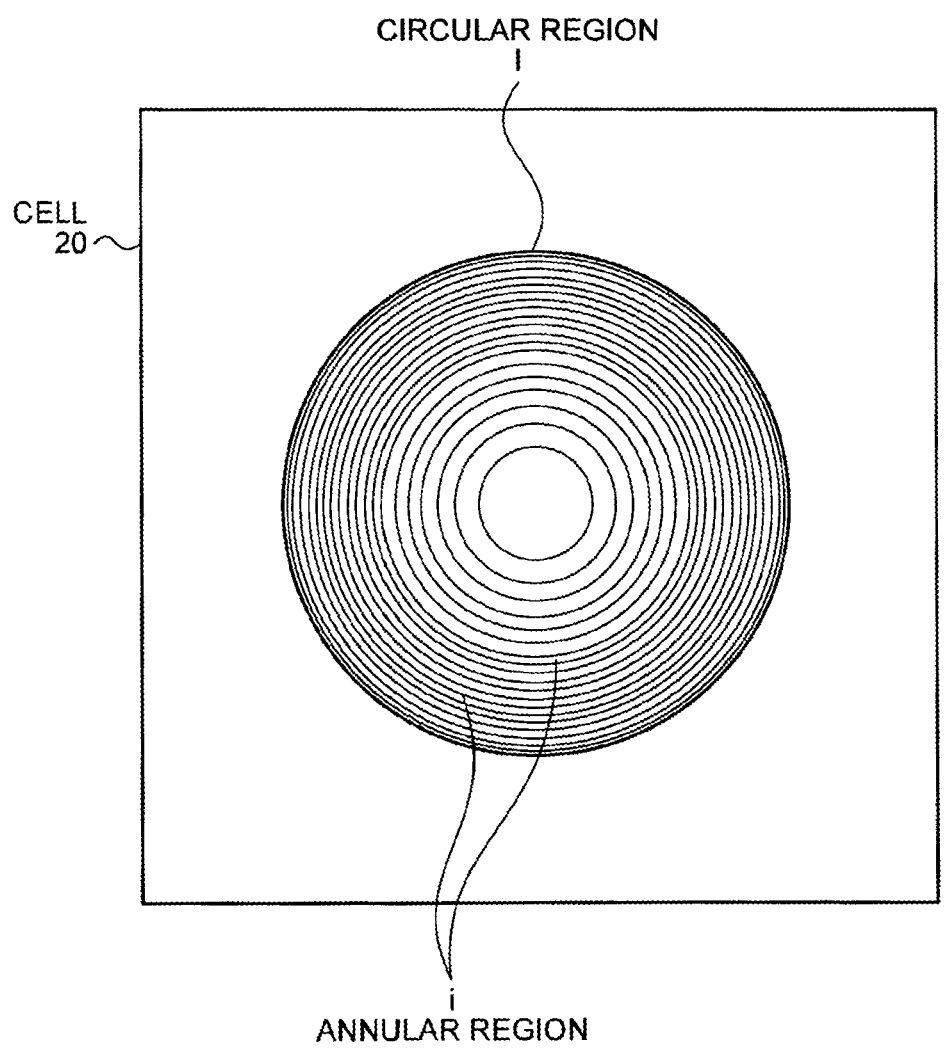
FIG. 6 is an explanatory diagram for depicting a circular region of a fuel rod divided into a plurality of annular regions.

FIG. 1 is a structure diagram for schematically depicting a reactor core serving as an analysis target of the analyzing apparatus that can execute the resonance calculation program according to the embodiment. FIG. 2 is a cross-sectional view of one fuel assembly serving as an analysis target region, taken along a plane orthogonal to an axial direction of the fuel assembly. FIG. 3 is an explanatory diagram for schematically depicting the analyzing apparatus. FIG. 4 is an explanatory diagram for depicting the analysis target region divided into a plurality of detailed regions. FIG. 5 is an explanatory diagram of an analysis target region on which neutron flight paths are drawn. FIG. 6 is an explanatory diagram of a circular region of a fuel rod divided into a plurality of annular regions.

As shown in FIG. 1, a reactor core 5 serving as a target of the reactor core design is stored in a nuclear reactor. This reactor core 5 is configured to include a plurality of fuel assemblies 6. Note that fuel replacement is made in units of fuel assemblies 6.

As shown in FIG. 2, each of the fuel assemblies 6 is configured to include a plurality of fuel rods 10, a plurality of cladding tubes 11 covering up the fuel rods 10, respectively, and a grid (not shown) binding up the plural cladding tubes 11. An interior of the fuel assembly 6 is filled with a moderator (coolant) 13 and configured so that a plurality of control rods 14 and an in-core nuclear instrumentation 15 can be inserted into the fuel assembly 6.

The fuel assembly 6 is formed into a square in cross section and constituted by, for example, 17 17 cells 20. Among the 17 17 cells 20, the control rods 14 are inserted into the cells 20, respectively, and an in-core nuclear instrumentation 15 is inserted into the cell 20 at the center of the assembly. At this time, the cells 20 into which the respective control rods 14 are inserted are referred to as "control rod guide tubes" and the cell 20 into which the in-core nuclear instrumentation 15 is inserted is referred to as "instrumentation guide tube". Furthermore, the fuel rods 10 are inserted into the other cells 20, respectively. If the fuel assemblies 6 are employed in a boiling light-water reactor (BWR), an exterior of each of the fuel assemblies 6 is covered with a channel box. If the fuel assemblies 6 are employed in a pressurized light-water reactor (PWR), the exterior of each of the fuel assemblies 6 is open. Further, an inter-assembly gap 12 is present outside of the channel box in a case of the BWR and outside of each of the fuel assemblies 6 in a case of the PWR.

The reactor core analysis program is described next. The reactor core analysis program is a program that can be executed on an analyzing apparatus (hardware) 40 and that is stored in a storage unit 41 of the analyzing apparatus 40. This reactor core analysis program includes a nuclear-constant calculation code 50 (see FIG. 3) calculating nuclear constants of the fuel assemblies 6 loaded in the reactor core 5, and a reactor core calculation code calculating nuclear characteristics in the reactor core 5 based on the calculated nuclear constants.

The nuclear-constant calculation code 50 defines a quadrilateral geometry that is a cross section obtained by taking each of the fuel assemblies 6 along a plane orthogonal to an axial direction as a two-dimensional analysis target region 30 (see FIG. 2). In addition, the nuclear-constant calculation code 50 is a code that can calculate nuclear constants in the analysis target region 30. Note that the nuclear constants are input data used in reactor core calculation and include a diffusion constant, an absorption cross section, a removal cross section, a generation cross section and the like. The nuclear constants that are input data for the reactor core calculation are generated by using the nuclear-constant calculation code.

The reactor core calculation code makes reactor core calculation by setting the calculated nuclear constants to nuclear nodes (not shown), respectively, each of which nodes is a small volume of a rectangular shape obtained by dividing each of the fuel assemblies 6 into a plurality of segments. The plural fuel nodes express the reactor core, and the reactor core calculation code serves as a code that can evaluate the nuclear characteristics of the interior of the reactor core such as a critical boron concentration, a power distribution, and reactivity coefficients by making the reactor core calculation.

If the reactor core analysis program mentioned above is executed on the analyzing apparatus 40, then the analyzing apparatus 40 calculates the nuclear constants in the analysis target region 30 of the fuel assembly 6 using the nuclear-constant calculation code 50, and makes the reactor core calculation by setting the calculated nuclear constants to the respective fuel nodes using the reactor core calculation code, thereby evaluating the nuclear characteristics of the reactor core 5.

The nuclear-constant calculation code 50 is described next specifically with reference to FIG. 3. The nuclear-constant calculation code 50 of the present embodiment is a two-dimensional transport calculation code corresponding to a heterogeneous system of the fuel assembly 6. The nuclear-constant calculation code 50 calculates such things as a neutron flux, burn-up, and the nuclear constants in the fuel assembly using a neutron transport equation according to Method of Characteristics (MOC).

The nuclear-constant calculation code 50 is configured to include a resonance calculation program 51, a transport calculation program 52, a burn-up calculation program 53, and a nuclear-constant calculation program 54, and is executed on the analyzing apparatus 40. Furthermore, the nuclear-constant calculation code 50 makes various calculations based on specification data input to the analyzing apparatus 40 and relating to the fuel assemblies 6 and on an effective cross section, to be described later, acquired from a cross section library 55 stored in the storage unit 41 of the analyzing apparatus 40. Examples of the specification data include a radius of one fuel rod, an inter-assembly gap, a fuel constitution, a fuel temperature, and a moderator temperature.

As shown in FIG. 4, the analysis target region 30 that is an analysis target of the nuclear-constant calculation code 50 is an arbitrarily set system and configured to include a plurality of cell regions 31a and 31b corresponding to the respective cells 20. Examples of the cell regions 31a and 31b include the cell region 31a into which a fuel rod 10 is inserted and the cell region 31b into which a control rod 14 is inserted. Each of the cell regions 31a and 31b is divided into a plurality of detailed regions. Parts of these plural detailed regions are resonance regions where a resonance phenomenon occurs. A case where the resonance regions are fuel regions f assuming that the detailed regions related to the fuel rods 10 are the fuel regions f is described below.

The resonance calculation program 51 is executed so as to calculate an effective cross section of each of the detailed regions i in light of the resonance phenomenon. Here, the resonance phenomenon means a phenomenon that a cross section increases dramatically if neutron energy is equal to predetermined energy. The resonance calculation program 51 divides the neutron energy into a plurality of energy groups and obtains the effective cross section that is an average cross section of the divided energy groups. That is, the resonance calculation program 51 calculates the effective cross section in multiple groups.

As described later in detail, the resonance calculation program 51 calculates the effective cross section (the effective microscopic cross section in the present embodiment) that is the input data to the transport calculation program based on the input specification data. The resonance calculation program 51 calculates this effective microscopic cross section based on a background cross section. That is, the resonance calculation program 51 calculates the background cross section based on the input specification data and calculates the effective microscopic cross section based on the calculated background cross section.

Furthermore, as shown in FIG. 6, the resonance calculation program 51 uses a circular region I that is an axial cross section of the fuel rod 10 and that is divided into a plurality of annular regions i in the analysis target region 30. Due to this, the resonance calculation program 51 can calculate physical quantities such as an effective cross section in each of the annular regions i and a neutron flux or a reaction rate obtained from the effective cross section. The annular regions i are obtained by radially dividing the circular regions I at predetermined intervals and are circumferentially annular, respectively.

The cross section library 55 stores a table that makes the background cross section correspond to the effective microscopic cross section and is provided for every nuclide. Due to this, if having calculated the background cross section, the resonance Calculation program 51 calculates the effective microscopic cross section from the cross section library with the calculated background cross section used as an argument.

The transport calculation program 52 calculates neutron fluxes of the respective detailed regions in each of the fuel assemblies 6 over multiple groups based on the MOC. The transport calculation program 52 is briefly described below.

As shown in FIG. 5, the transport calculation program 52 creates a plurality of neutron flight paths S on the analysis target region 30 divided into a plurality of detailed regions i. The transport calculation program 52 solves a neutron transport equation and calculates the neutron flux in each of the detailed regions for each of the created neutron flight paths S. In this case, the neutron transport equation for a group g on one-dimensional coordinates along a vector direction of each of the neutron flight paths S is expressed by the following Equation (2).

[Equation 2]

$$\frac{d\psi^g(s)}{ds} + \sum_t^g \psi^g(s) = \overline{Q}^g \quad (2)$$

$\psi^g$ ... Neutron flux in group g.

$\Sigma_t^g$ ... Macroscopic total cross section in group g.

$\overline{Q}^g$ ... Neutron source in group g.

The macroscopic total cross section $_{t,g}$ used in the Equation (2) is calculated based on the effective microscopic cross section calculated by the resonance calculation program 51.

The burn-up calculation program 53 executes a burn-up calculation for tracking generation and extinction of nuclides in the reactor core 5. The burn-up calculation program 53 evaluates a time variation of an atomic number density of each nuclide by solving the burn-up equation, and gives input conditions of multiple-group neutron transport calculation for each burn-up point. As a result, the burn-up calculation program 53 tracks a burn-up state (time variation in burn-up) by alternately making the burn-up calculation and the transport calculation for every predetermined sampling cycle.

The nuclear-constant calculation program 54 collapses and homogenizes the effective macroscopic cross sections of the multiple groups in the fuel assembly 6 and calculates homogenized macroscopic nuclear constants with the neutron fluxes of the multiple groups in the fuel assembly 6 obtained by the transport calculation program 52 used as a weight.

The resonance calculation program 51 according to the present embodiment is described below in detail. This resonance calculation program makes the resonance calculation based on the equivalence principle. In the resonance calculation based on the equivalence principle, the resonance calculation program 51 calculates the background cross section corresponding to the heterogeneous system, and acquires the effective cross section for the heterogeneous system from the table expressed by the following Equation (3) with the calculated background cross section used as an argument. Note that the table expressed by the Equation (3) is stored in the cross section library 55.

[Equation 3]

$$\sigma^A_{x,g} = f(\sigma^A_0) \quad (3)$$

$\sigma^r_{x,g}$ ... Cross section of the group g for reaction x and resonance nuclide r.

$\sigma^r_0$ ... Background cross section of resonance nuclide r.

A calculation expression used in the resonance calculation program 51 is described next. The neutron flux in an annular region i is expressed by the following Equation (4).

[Equation 4]

$$\phi_i(E) = \frac{1}{E}\left[\{1 - P_{e,i}^{lat}(E)\}\frac{\sum_p^f}{\sum_t^f(E)} + P_{e,i}^{lat}(E)\right] \quad (4)$$

E ... Neutron energy.

$\phi_i$ ... Neutron flux in the annular region i.

$P_{e,i}^{lat}(E)$ ... Neutron escape probability in annular region i in respect of lattice system.

$\Sigma_p^f$ ... Macroscopic potential scattering cross section in the resonance region f.

$\Sigma_t^f$ ... Macroscopic total cross section in the resonance region f.

At this time, $P_{e,i}(E)$, that is, the neutron escape probability is expressed by the following Equation (5) that represents a gray range from a black body the annular regions of which absorb all neutrons to a white body the annular regions of which absorbs no neutrons and that is a polynomial rational expression including a first rational coefficient $_n$ and a second rational coefficient $_n$. Note that $I_{i,m}$ defined in the Equation (5) represents an average chord length of the annular region i for the m-th term.

[Equation 5]

$$P_{e,i}^{lat}(E) = \sum_{m=1}^{4} \gamma_{i,m} \sum_{n=1}^{N} \beta_n \frac{\alpha_n}{\sum_t^f (E)l_{i,m} + \alpha_n} = \quad (5)$$

$$\gamma_{i,1} \sum_{n=1}^{N} \beta_n \frac{\alpha_n}{\sum_t^f (E)l_{i,1} + \alpha_n} + \gamma_{i,2} \sum_{n=1}^{N} \beta_n \frac{\alpha_n}{\sum_t^f (E)l_{i,2} + \alpha_n} +$$

$$\gamma_{i,3} \sum_{n=1}^{N} \beta_n \frac{\alpha_n}{\sum_t^f (E)l_{i,3} + \alpha_n} + \gamma_{i,4} \sum_{n=1}^{N} \beta_n \frac{\alpha_n}{\sum_t^f (E)l_{i,4} + \alpha_n}$$

$$l_{i,m} = \frac{2R}{\pi} \cdot \left(\sqrt{1-\rho^2} + \frac{1}{\rho}\sin^{-1}\rho \pm \frac{\pi}{2}\rho\right)$$

$$\begin{bmatrix} m = 1 : +(\frac{\pi}{2}\rho), \rho - \rho_i \\ m = 2 : -(\frac{\pi}{2}\rho), \rho = \rho_i \\ m = 3 : +(\frac{\pi}{2}\rho), \rho = \rho_{i-1} \\ m = 4 : -(\frac{\pi}{2}\rho), \rho = \rho_{i-1} \end{bmatrix}$$

$\alpha_n$ ... First rational coefficient.

$\beta_n$ ... Second rational coefficient.

$l_{i,m}$ ... Average chord length of the annular region i for m-th term.

R ... Radius of circular region I.

$\rho_i$ ... Outer-radius relative value of annular region i (standardized by pellet radius).

The neutron escape probability $P_{e,i}$ includes a geographical coefficient $\gamma_{i,m}$ to calculate the neutron escape probability $P_{e,i}$ for each annular region i. This geographical coefficient $\gamma_{i,m}$ represents geographical shapes of a plurality of annular regions i. Note that $I_i$ is given by $4V_i/S_0$, where $S_0$ represents a surface area of the circular region I and $V_i$ represents a volume of the annular region i, which are given as specification data. The neutron escape probability $P_{e,i}$ expressed by the Equation (5) is explained below with reference to FIG. 7.

Figure 7:
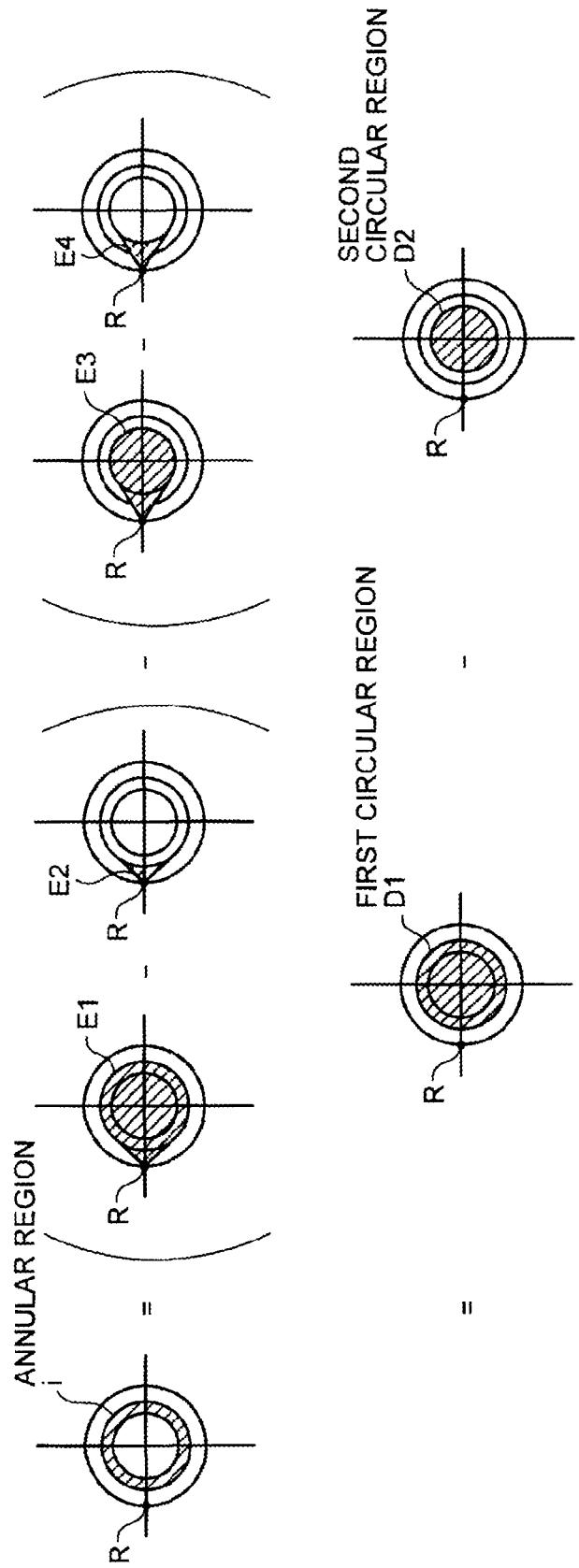
FIG. 7 is an explanatory diagram for depicting a neutron escape probability in predetermined annular regions.

FIG. 7 is an explanatory diagram of a neutron escape probability in predetermined annular regions. As shown in the Equation (5), the geographical coefficient represents predetermined annular regions i using four terms of $\gamma_{i,1}$ (first term), $\gamma_{i,2}$ (second term), $\gamma_{i,3}$ (third term), and $\gamma_{i,4}$ (fourth term). Note that the neutron escape probability $P_{e,i}$ represents the probability of escape of neutrons from an outer circumference of the circular region I of the fuel rod 10 and that neutrons are, therefore, set to pass through a point R on the outer circumference of the circular region I of the fuel rod 10.

The first term on a right-hand side of the Equation (5) represents a first region E1 where neutrons pass through an interior of a circular region constituted by an outer circumference of a predetermined annular region i among those escaping from the outer circumference of the predetermined annular region i to an outer circumference of the fuel rod 10. The second term represents a second region E2 where neutrons do not pass through the interior of the circular region constituted by the outer circumference of the predetermined annular region i among those escaping from the outer circumference of the predetermined annular region i to the outer circumference of the fuel rod 10. The third term represents a third region E3 where neutrons pass through an interior of a circular region constituted by an outer circumference of an annular region (i−1) located inside of the predetermined annular region i among those escaping from the outer circumference of the annular region (i−1) to the outer circumference of the fuel rod 10. The fourth term represents a fourth region E4 where neutrons do not pass through the interior of the circular region constituted by the outer circumference of the annular region (i−1) located inside of the predetermined annular region i among those escaping from the outer circumference of the annular region (i−1) to the outer circumference of the fuel rod 10.

A first circular region D1 inside of the outer circumference of the predetermined annular region i can be thereby represented by subtracting the second region E2 from the first region E1. A second circular region D2 inside of an inner circumference of the predetermined annular region i can be represented by subtracting the fourth region E4 from the third region E3. The predetermined annular region i can be represented by subtracting the second circular region D2 from the first circular region D1. At this time, $\gamma_{i,1}$, $\gamma_{i,2}$, $\gamma_{i,3}$, and $\gamma_{i,4}$ are expressed by the following Equation (6).

[Equation 6]

$$(\gamma_{i,1}, \gamma_{i,2}, \gamma_{i,3}, \gamma_{i,4}) = \left( \frac{\rho_i l_{i,1}}{l_i}, -\frac{\rho_i l_{i,2}}{l_i}, -\frac{\rho_{i-1} l_{i,3}}{l_i}, \frac{\rho_{i-1} l_{i,4}}{l_i} \right) \quad (6)$$

By assigning the Equation (5) to the Equation (4), the following Equation (7) is obtained.

[Equation 7]

$$\phi_i(E) = \frac{1}{E} \sum_{m=1}^{4} \gamma_{i,m} \sum_{n=1}^{N} \beta_n \frac{\sum_{p}^{f} l_{i,m} + \alpha_n}{\sum_{t}^{f} (E) l_{i,m} + \alpha_n}$$

$$\cong \frac{1}{E} \sum_{m=1}^{4} \gamma_{i,m} \sum_{n=1}^{N} \beta_n \frac{\sigma_p^r + \sigma_0^{nmr}}{\sigma_t^r(E) + \sigma_0^{nmr}} \quad (7)$$

$\sigma_p^r$ ... Microscopic potential scattering cross section of the resonance nuclide r.

$\sigma_t^r$ ... Microscopic total cross section of the resonance nuclide r.

$\sigma_0^{nmr}$ Background cross section of the resonance nuclide r on n-th term of $\beta_n$ and m-th term of $\gamma_{i,m}$.

Note that the left-hand side of the Equation (7) can be transformed to the right-hand side of the Equation (7) by ignoring absorption reaction of nuclides k other than the resonance nuclide r included in the fuel region f and resonance scattering. At this time, the background cross section is expressed by the following Equation (8).

[Equation 8]

$$\sigma_0^{nmr} = \frac{\sum_{k \neq r} N_k^i \sigma_p^k + \alpha_n / l_{i,m}}{N_r^i} \quad (8)$$

$N_k^i$ ... Atomic number density of nuclides k in annular region i.

$N_r^i$ ... Atomic number density of resonance nuclide r in annular region i.

$\sigma_p^k$ ... Microscopic potential scattering cross section of nuclides k.

Next, a resonance integral for the nuclide r, the reaction x, and the group g is defined by the following Equation (9).

[Equation 9]

$$I_{x,g}^r(\sigma_0^{nmr}) \equiv \frac{\int_{E_g}^{E_{g-1}} dE \sigma_x^r(E) \phi_i(E, \sigma_0^{nmr})}{\int_{E_g}^{E_{g-1}} dE \frac{1}{E}} \quad (9)$$

$I_{x,g}^r$ ... Resonance integral for group g, reaction x, and resonance nuclide r.

$\sigma_x^r$ ... Microscopic cross section of resonance nuclide r for reaction x.

Moreover, the effective microscopic cross section for the nuclide r, the reaction x, and the group g in the annular region is expressed by the following Equation (10). A right-hand side of the Equation (10) is obtained by assigning the Equations (7) and (9) to a center side of the Equation (10).

[Equation 10]

$$\sigma_{x,g}^{r,i} = \frac{\int_{E_g}^{E_{g-1}} dE \sigma_x^r(E) \phi_i(E)}{\int_{E_g}^{E_{g-1}} dE \phi_i(E)} \qquad (10)$$

$$= \frac{\sum_{m=1}^{4} \gamma_{i,m} \sum_{n=1}^{N} \beta_n I_{x,g}^r(\sigma_0^{nmr})}{1 - \sum_{m=1}^{4} \gamma_{i,m} \sum_{n=1}^{N} \beta_n \frac{I_{a,g}^r(\sigma_0^{nmr})}{\sigma_p^r + \sigma_0^{nmr}}}$$

$\sigma_{x,g}^{r,i}$ ... Effective microscopic cross section of group g in annular region i for reaction x and resonance nuclide r.

$I_{a,g}^r$ ... Resonance integral for group g, absorption reaction a, and resonance nuclide r.

When N is set to 1 (N=1) in the Equation (10) assuming that the fuel region f is a single region, the relation between the resonance integral and the effective microscopic cross section for the reaction x and the absorption reaction a (x=a) is obtained, the obtained relation is reassigned to the Equation (10), and the effective microscopic cross section is recalculated, the following Equation (11) that represents the effective microscopic cross section based on the equivalence principle is obtained.

[Equation 11]

$$\sigma_{x,g}^{r,i} = \frac{\sum_{m=1}^{4} \gamma_{i,m} \sum_{n=1}^{N} \beta_n \sigma_{x,g}^r(\sigma_0^{nmr}) \varphi_g^r(\sigma_0^{nmr})}{\sum_{m=1}^{4} \gamma_{i,m} \sum_{n=1}^{N} \beta_n \varphi_g^r(\sigma_0^{nmr})} \qquad (11)$$

Calculation equations for calculating the first rational coefficient $_n$ and the second rational coefficient $_n$ are explained next. The neutron flux at an arbitrary energy point in the fuel region f can be regarded as a function of the macroscopic total cross section in the fuel region f. Further, a macroscopic total reaction rate $RR_{t,f}$ obtained from a product between the neutron flux and the macroscopic total cross section is expressed by the following Equation (12). At this time, the second rational coefficient $_n$ satisfies the following Equation (13).

[Equation 12]

$$RR_t^f\left(\sum_t^f\right) = \sum_{n=1}^{N} \beta_n \sum_t^f \frac{\sum_t l_f + \alpha_n}{\sum_t l_f + \alpha_n} \qquad (12)$$

$RR_t^f$ ... Macroscopic total reaction rate.

[Equation 13]

$$\sum_{n=1}^{N} \beta_n = 1 \qquad (13)$$

Therefore, to calculate the rational coefficients $_n$ and $_n$ using the Equations (12) and (13), a neutron flux $_f$ is calculated independently by one-group fixed-source calculation based on the MOC for an arbitrary macroscopic total cross section $_{t,f}$ including the gray range from the white body to the black body in the fuel region f. Further, pairs $(_{t,f}, RR_{t,f})$ that are pairs of the macroscopic total cross section $_{t,f}$ and the macroscopic total reaction rate $RR_{t,f}$ that is the product between the macroscopic total cross section $_{t,f}$ and the neutron flux $_f$ are created. Note that 2N−1 or more pairs of $(_{t,f}, RR_{t,f})$ are created because the number of unknown coefficients is 2N−1. The rational coefficients $_n$ and $_n$ in the Equation (12) are numerically calculated to satisfy the created $(_{t,f}, RR_{t,f})$.

Figure 8:
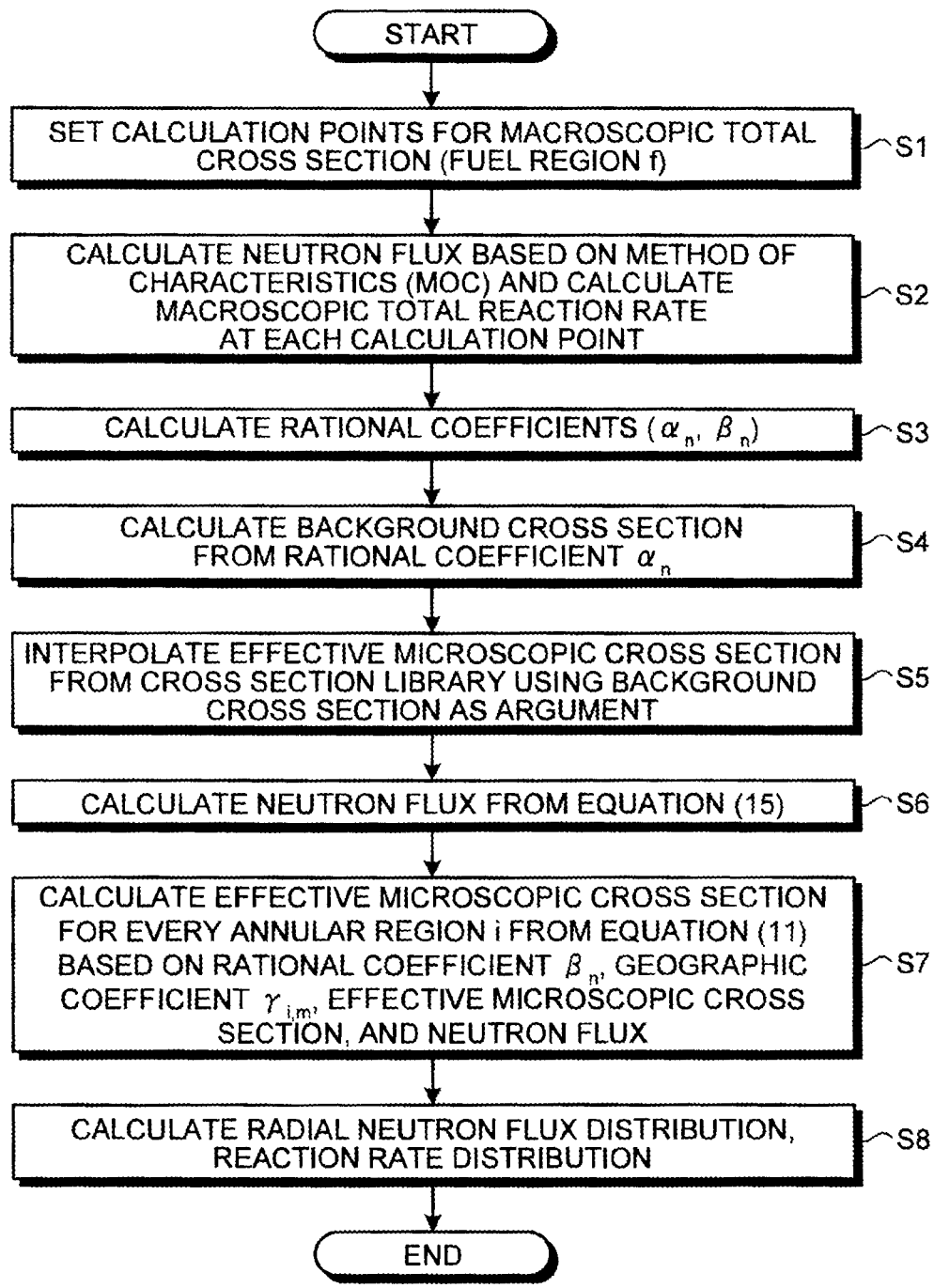
FIG. 8 is a flowchart for calculating an effective microscopic cross section by a resonance calculation program.

With reference to FIG. 8, a flow of the analyzing apparatus 40 for causing the resonance calculation program 51 to calculate the effective microscopic cross section using the above calculation equations is described next. FIG. 8 is a flowchart for calculating the effective microscopic cross section by the resonance calculation program. While the flow is described in a case of calculating the effective microscopic cross section of the resonance nuclide r in the fuel region f, the flow can be applied to a case of calculating the effective microscopic cross section of the resonance nuclide r contained in the cladding tube 11 or a non-fuel matter.

First, the analyzing apparatus 40 sets 2N−1 or more calculation points in the gray range from the white body to the black body in the fuel region f that is the resonance region assuming the macroscopic total cross section as $_{t,f}$ (Step S1).

Upon setting the calculation points, the analyzing apparatus 40 performs the one-group fixed-source calculation based on the MOC to the macroscopic total cross section $_{t,f}$ using the following Equation (14) to calculate the neutron flux and calculates the macroscopic total reaction rate $RR_{t,f}$ from the product between the calculated neutron flux and the macroscopic total cross section $_{t,f}$ (Step S2). The pairs $(_{t,f}, RR_{t,f})$ of the macroscopic total cross section and the macroscopic total reaction rate are thereby created.

[Equation 14]

$$\frac{d\phi_f(s)}{ds} + \sum_t^f \phi_f(s) = \sum_p^f \qquad (14)$$

Upon creating the pairs $(_{t,f}, RR_{t,f})$, the analyzing apparatus 40 calculates the rational coefficients $_n$ and $_n$ in the Equation (11) to satisfy the created $(_{t,f}, RR_{t,f})$ (Step S3: coefficient calculation step).

After calculating the rational coefficients $_n$ and $_n$, the analyzing apparatus 40 calculates the background cross section using the Equation (8) based on the rational coefficient $_n$ and the given specification data (Step S4: background cross-section calculation step). Next, the analyzing apparatus 40 interpolates the effective microscopic cross section from the Equation (3) stored in the cross section library 55 with the calculated background cross section used as the argument (Step S5: effective cross-section interpolation step). Subsequently, the analyzing apparatus 40 assigns the interpolated effective microscopic cross section, the background cross section, and the microscopic potential cross section for the resonance nuclide r to the following Equation (15), thereby calculating the neutron flux (Step S6).

[Equation 15]

$$\varphi_g^r(\sigma_0^{nmr}) = \frac{\sigma_P^r + \sigma_0^{nmr}}{\sigma_{a,g}^r(\sigma_0^{nmr}) + \sigma_P^r + \sigma_0^{nmr}} \quad (15)$$

Based on the rational coefficient n calculated at Step S3, the effective microscopic cross section calculated at Step S5, and the neutron flux calculated at Step S6, the analyzing apparatus 40 calculates the final effective microscopic cross section in the heterogeneous system from the Equation (11) (Step S7: effective cross-section calculation step).

Thereafter, based on the effective microscopic cross section calculated at the effective cross-section calculation step S7, the analyzing apparatus 40 calculates the physical quantities such as the neutron flux in the heterogeneous system and the reaction rate for each of the annular regions i (Step S8: radial-distribution calculation step).

With the above configuration, the resonance calculation program 51 according to the present embodiment uses the polynomial rational expression representing the neutron escape probability and including, as factors, the geographical coefficient $_{i,m}$ representing geographic shapes of the annular regions i obtained by dividing the circular region I of the fuel rod 10. Due to this, it is possible to evaluate the distribution of each physical quantity in the radial direction of the circular region I of the fuel rod 10 by calculating the effective cross section for each of the annular regions i based on the geographical coefficient.

REFERENCE SIGNS LIST 5 reactor core
6 fuel assembly
10 fuel rod
11 cladding tube
12 inter-assembly gap
13 moderator
14 control rod
15 in-core nuclear instrumentation
20 cell
30 analysis target region
40 analyzing apparatus
41 storage unit
50 nuclear-constant calculation code
51 resonance calculation program
52 transport calculation program
53 burn-up calculation program
54 nuclear-constant calculation program
55 cross section library
f fuel region
I circular region
i annular region
E1 first region
E2 second region
E3 third region
E4 fourth region
D1 first circular region
D2 second circular region

The invention claimed is:

1. A non-transitory computer readable media, comprising a resonance calculation program executable on hardware for performing a resonance calculation based on equivalence principle of calculating an effective cross section serving as an input value for neutron transport calculation at a time of calculating a neutron flux in a fuel assembly storing a cylindrical fuel rod by the neutron transport calculation, wherein a cross section of the fuel assembly taken along an orthogonal plane orthogonal to an axial direction of the fuel rod is defined as an analysis target region for the resonance calculation, the analysis target region is divided into a plurality of detailed regions, a part of the detailed regions serving as a resonance region where a resonance phenomenon occurs, a neutron escape probability in the resonance region is obtained by a polynomial rational expression including a first rational coefficient, a second rational coefficient, and a geographical coefficient, the first and second rational coefficients serving as factors representing a gray range from a black body the resonance region of which absorbs all neutrons to a white body the resonance region of which absorbs no neutrons, the geographical coefficient serving as a factor representing geographical shapes of a plurality of annular regions that are circumferentially annular and that are obtained by radially dividing a circular region that is an axial cross section of the fuel rod at predetermined intervals, and the resonance calculation program includes:

a coefficient calculation step of calculating the first rational coefficient and the second rational coefficient to satisfy a physical quantity calculated over the gray range by a method of characteristics;

a background cross-section calculation step of calculating a background cross section based on the calculated first rational coefficient and an average chord length corresponding to four regions expressing the annular regions;

an effective cross-section interpolation step of interpolating the effective cross section from the background cross section;

an effective cross-section calculation step of calculating the effective cross section depending on the annular regions by synthesizing the interpolated effective cross section based on the second rational coefficient and the geographical coefficient; and a radial-distribution calculation step of calculating distribution of the physical quantity in a radial direction of the circular region using the effective cross section dependent on the annular regions.

2. The non-transitory computer readable media of claim 1, wherein the geographical coefficient is represented by four terms corresponding to the four regions expressing the predetermined annular regions, a first term of the geographical coefficient represents a first region where neutrons pass through an interior of a circular region constituted by an outer circumference of a predetermined annular region' among those escaping from the outer circumference of the predetermined annular region to an outer circumference of the fuel rod, a second term of the geographical coefficient represents a second region where neutrons do not pass through the interior of the circular region constituted by the outer circumference of the predetermined annular region among those escaping from the outer circumference of the predetermined annular region to the outer circumference of the fuel rod, a third term of the geographical coefficient represents a third region where neutrons pass through an interior of a circular region located inside of the predetermined annular region among those escaping from the outer circumference of the circular region to the outer circumference of the fuel rod, a fourth term of the geographical coefficient represents a fourth region where neutrons do not pass through the interior of the circular region located inside of the predetermined annular region among those escaping from the outer circumference of the circular region to the outer circumference of the fuel rod, and at the radial-distribution calculation step, the effective cross section in the predetermined annular region or the physical quantity obtained from the effective cross section is calculated by subtracting a second circular region from a first circular region, the first circular region being inside of the outer circumference of the predetermined annular region and obtained by subtracting the second region from the first region, the second circular region being inside of an inner circumference of the predetermined annular region and obtained by subtracting the fourth region from the third region.

3. The non-transitory computer readable media of claim 1, wherein the neutron escape probability in the resonance region is expressed by following calculation equation (1):

[Equation 1]

$$P_{e,i}^{lat}(E) = \sum_{m=1}^{4} \gamma_{i,m} \sum_{n=1}^{N} \beta_n \frac{\alpha_n}{\sum_{t}^{f}(E)l_{i,m} + \alpha_n} \quad (1)$$

E ... Neutron energy
$P_{e,i}^{lat}(E)$ ... Neutron escape probability in annular region i in respect of lattice system
$\alpha_n$ ... First rational coefficient
$\beta_n$ ... Second rational coefficient
$\Sigma_t^f$ ... Macroscopic total cross section in a resonance region f
$l_{i,m}$ ... Average chord length in the annular region i
$\gamma_{i,m}$ ... Geographical coefficient in annular region i.

4. An analyzing apparatus configured to execute the resonance calculation program stored in the non-transitory computer readable media of claim 1.

* * * * *